Robert T. Webb,
Inventor.
Koenig and Pope,
Attorneys.

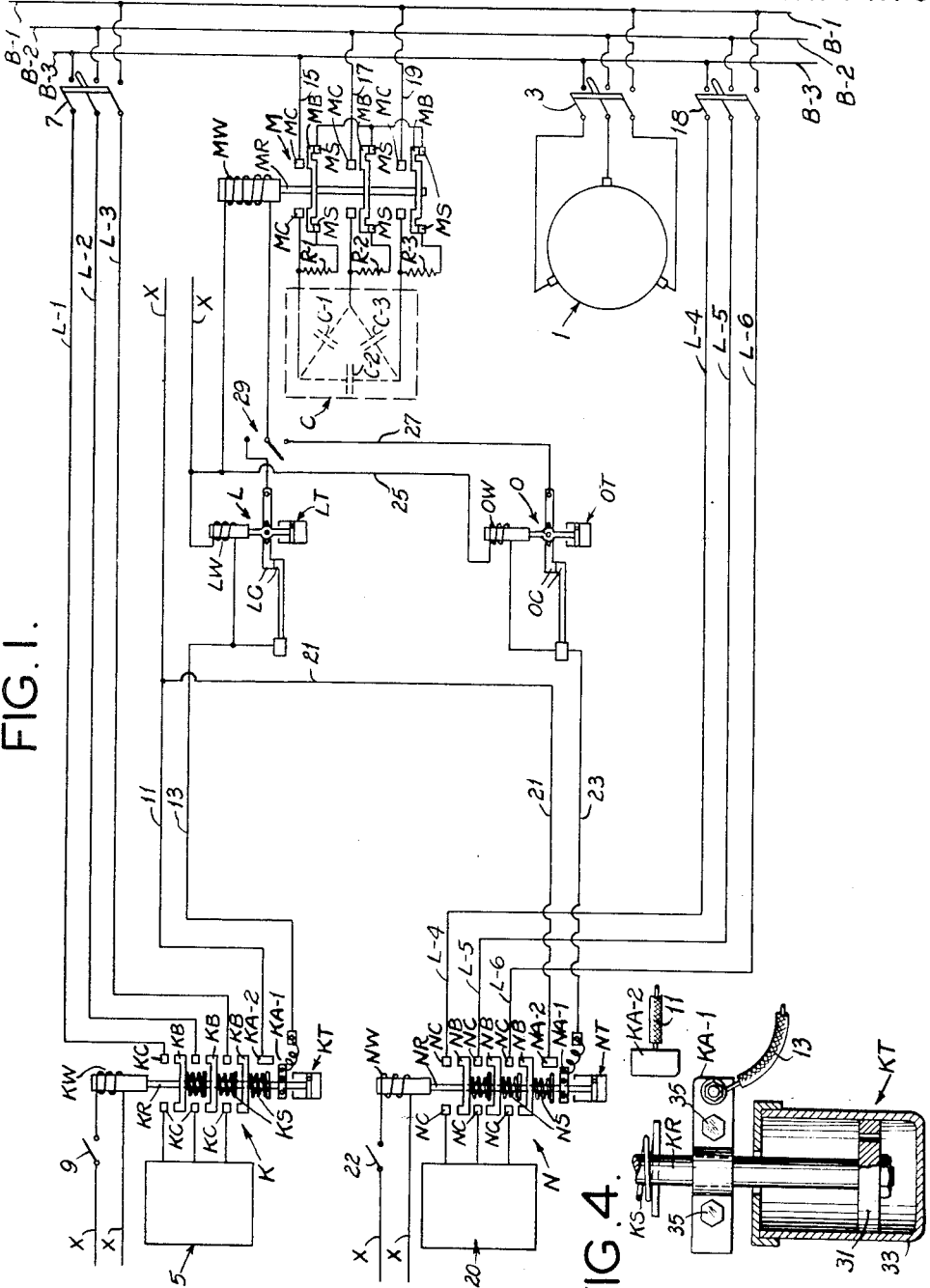
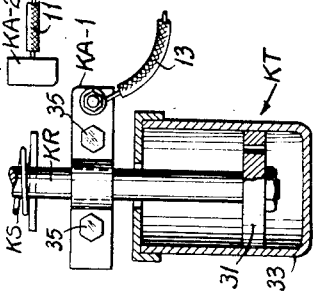

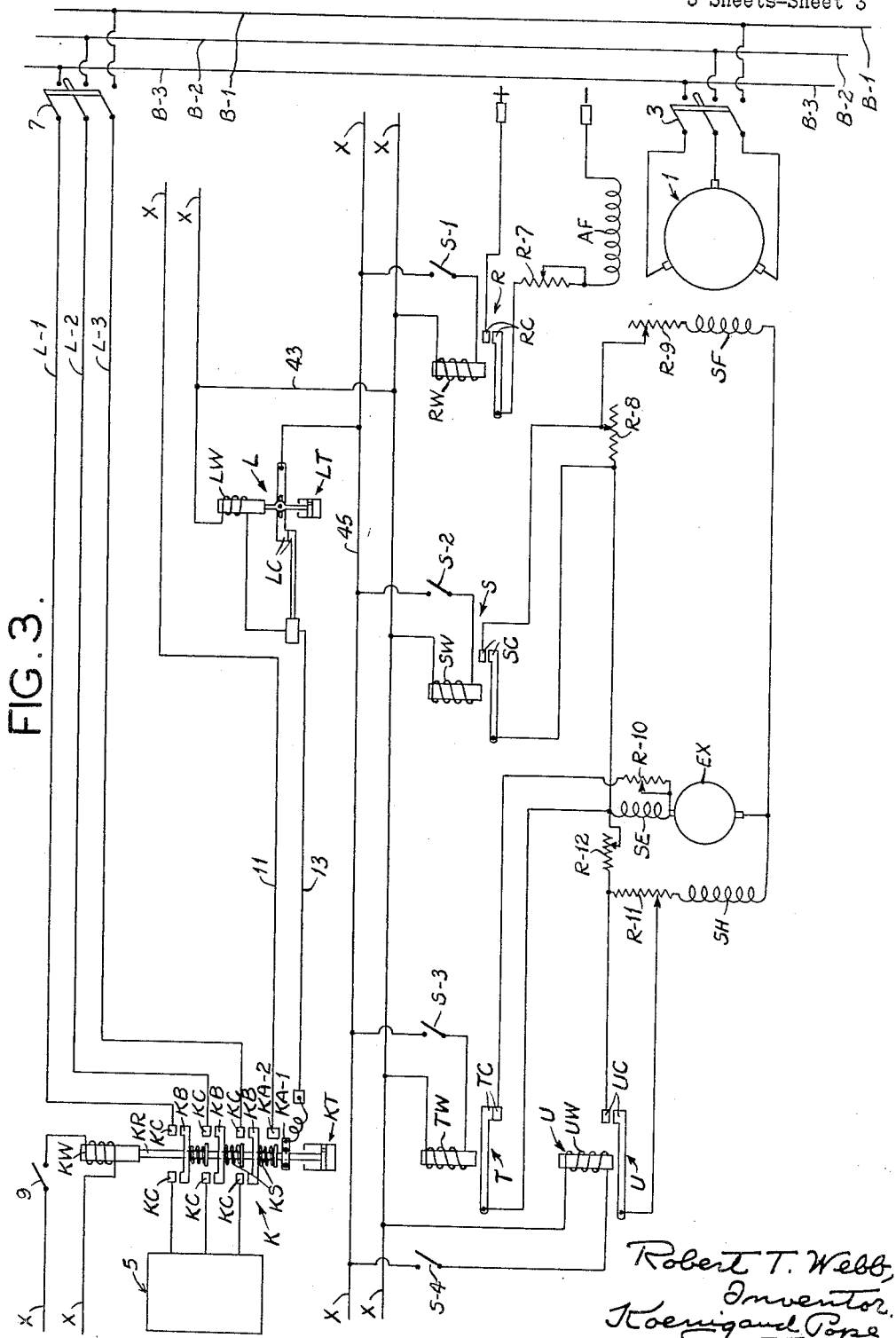

United States Patent Office 2,711,488
Patented June 21, 1955

2,711,488

LINE DROP COMPENSATOR

Robert T. Webb, University City, Mo.

Application September 8, 1952, Serial No. 308,361

21 Claims. (Cl. 307—103)

This invention relates to voltage regulators and more particularly to voltage regulators for A. C. distribution systems.

Among the several objects of this invention may be noted the provision of voltage regulators which supplement the regulation supplied by conventional voltage regulators and give accurately timed power factor corrections in an A. C. system; the provision of voltage regulators which minimize voltage fluctuations in an A. C. system during initial energization of loads supplied by the system; the provision of voltage regulators of the class described which will operate a plurality of A. C. motors of the same or different characteristics when energized at random intervals without temporary undesirable reductions in the voltage of an A. C. supply system; the provision of voltage regulators of the class described which substantially compensate the voltage variation of an A. C. source caused by A. C. motors during the period of motor starting; and the provision of voltage regulators which may be conveniently connected to and effectively operated in conjunction with either regulated or unregulated existing A. C. supply systems. Other features will be in part apparent and in part pointed out hereinafter.

The invention accordingly comprises the structures hereinafter described, the scope of the invention being indicated in the following claims.

Briefly, the invention is directed to a voltage regulator for an A. C. power source supplying energy to an electrical load which when initially energized normally would cause a variation in the voltage of said source, comprising a first contactor adapted when closed to interconnect said power source to said load and to energize a control circuit, a second contactor adapted to interconnect means for compensating for said voltage variation with said A. C. power source in response to energization of said control circuit, and time delay means adapted to deenergize said control circuit a predetermined time after the closing of said first contactor whereby said variation in the voltage of said source is substantially compensated only during initial energization of said load.

In the accompanying drawings, in which several of various possible embodiments of the invention are illustrated, Fig. 1 is a schematic circuit diagram of a voltage regulator of the present invention connected in an A. C. distribution system;

Fig. 3 is a schematic diagram of a third embodiment of the invention connected in an A. C. distribution system; and, Fig. 4 is an enlarged cross section of a time delay device shown schematically in the preceding figures.

Corresponding reference characters indicate corresponding parts throughout the several views of the drawings.

Figure 2:
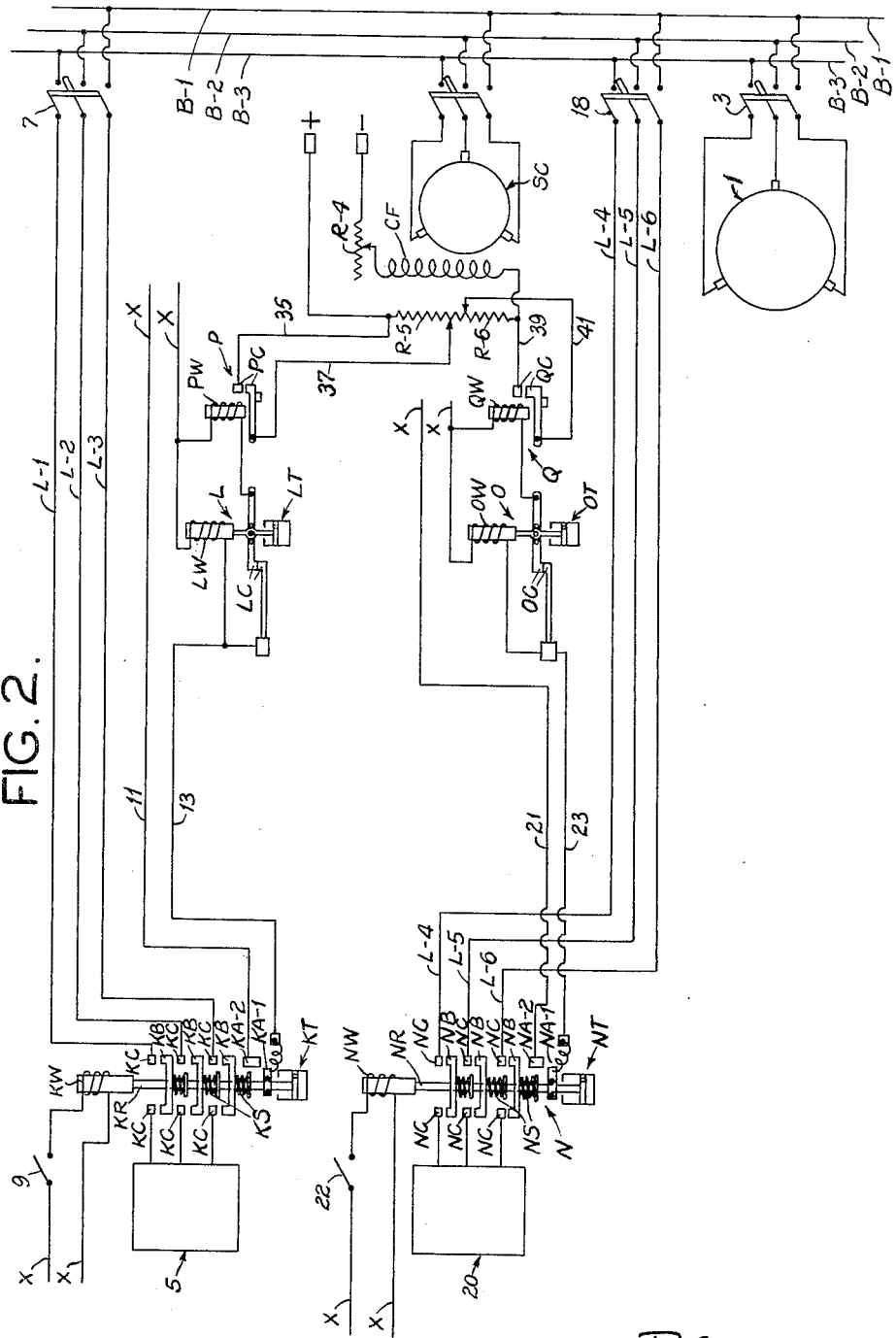
Fig. 2 is a schematic diagram of a second embodiment of the invention connected in an A. C. distribution system.

The energizing of an electric load from an A. C. source will affect the voltage of the source. When the load includes a reactive load unit, such as the inductive loads of many types of A. C. motors, not only the line voltage (because of the current variation), but also the phase relationship between the line voltage and the current (because of the power factor variation) is also affected. In other words, when an alternator is required to deliver a substantial leading current the effect of this current upon the alternator is equivalent to increasing its net excitation, with the result that its terminal voltage is increased, whereas if a lagging current must be delivered the effect is equivalent to decreasing the net excitation of the alternator and thereby reducing its terminal voltages. This principle applies equally to the case of a transformer which, if required to deliver a substantial leading current, will have an increased terminal voltage over that produced when the same transformer is delivering a unity power factor current or a lagging power factor current.

Many devices have been proposed to regulate the line voltage to compensate for the electrical loading and the power factor variations. These devices, however, can only react to correct voltage fluctuations after the voltage is affected. That is, these devices do not act to correct the voltage variations until the voltage actually varies, or in other words, until there is at least an incipient variation in line voltage.

In accordance with the present invention, however, voltage variation is anticipated or predicted and the sudden lowering of voltage, which would otherwise occur, is avoided because the factor which would cause a resultant variation is compensated in timed sequence with the initial energization of the load. Moreover, the sudden variation in line voltage normally caused by initial energization of a load is not only avoided, but after the period of sudden load variation is over, such as the starting period of most inductive motors, the compensating effect is automatically removed and the conventional voltage regulator system, if such is already part of the system, will operate in the customary fashion.

Referring now more particularly to Fig. 1, reference numeral 1 designates a synchronous generator or alternator which supplies A. C. power through a switch 3 to station bus bars B-1, B-2 and B-3. An electrical load, such as an A. C. motor 5 is interconnected through a switch 7, feeder lines L-1, L-2 and L-3, and a solenoid operated contactor K with the station bus. Contactor K includes a control winding KW, contactor bars KB, contacts KC, an insulated contactor rod KR and contactor springs KS, which resiliently support the contactor bars on rod KR. The lower end of rod KR carries a timer KT and one of a set of auxiliary contacts KA-1. The spacing between KA-1 and its cooperating contact KA-2 is adjustable so that upon energization of kw. (from a power source X—X through a switch 9) contacts KA-1 and KA-2 may be closed prior to, simultaneously with, or subsequent to the closing of bars KB and their associated contacts KC.

Auxiliary contacts KA-1 and KA-2 are included in a control circuit comprising wires 11 and 13, a timing relay L, a single-pole-double-throw switch 29 and a control winding MW of a contactor M. Relay L comprises a winding LW, a pair of contacts LC and an adjustable time delay mechanism LT. More specifically the control circuit includes auxiliary contacts KA-1 and KA-2 series-connected with winding MW and contacts LC, and winding LW which is shunt-connected across the latter two circuit components.

Contactor M further includes an insulated contactor rod MR, contactor bars MB, upper contacts MC and lower contacts MS. When rod MR is in its upper or energized position, it interconnects a power factor connecting device C, such as illustrated by static condensers C-1, C-2 and C-3, through wires 15, 17 and 19 to the bus B-1, B-2 and B-3. When in the lower or deenergized position, rod MR disconnects condensers C-1, C-2 and C-3 from wires 15, 17 and 19 and shorts each of these condensers through discharge resistors R-1, R-2 and R-3.

In the lower portion of Fig. 1 are illustrated a second contactor N with its associated components NW, NB, NC, NR, NS, NT, and a set of auxiliary contacts NA-1 and NA-2. These components correspond respectively to the above-described components KW, KB, KC, KR, KS, KT, KA-1 and KA-2. Contactor N serves to interconnect an A. C. motor 20 to bus B-1, B-2 and B-3 through lines L-4, L-5 and L-6 and a switch 18. Winding NW is connected to a source of electrical power X—X through a switch 22.

A timing relay O, similar in all respects to relay L is shown connected to contacts NA-1 and NA-2 by wires 21 and 23. The control circuit, responsive to the action of contacts NA-1 and NA-2, includes relay O, wires 21, 23, 25, 27, switch 29 and contactor winding MW.

The structure of the timer KT is shown in Fig. 4. KT comprises a dashpot including a vented piston 31 affixed to the lower end of rod KR and a cup 33 in which it slides. The position of contact KA-1 may be adjusted by loosening clamp screws 35 and moving the contact up or down along rod KR before retightening. The same structure is utilized in timers NT, and components LT and OT, except that the contacts LC and OC are arranged to open rather than close on upward movement of plunger 31.

Operation is as follows:

The potential of A. C. voltage supplied by bus bars B-1, B-2 and B-3 is a function of load current and the phase relationship of this current to the line voltage. The bus or line voltage may be regulated or unregulated. If switches 3, 7 and 18 are closed and thereafter switch 9 is closed the rod KR is caused to move upwardly and close the A. C. supply circuit between motor 5 and L-1, L-2 and L-3.

Depending upon the timing function of KT and the adjustment of contact KA-1, contacts KA-1 and KA-2 will be closed sequentially in advance of, simultaneously, or after the closing of contacts KC by bars KB. The closing of switch 9, therefore, will interconnect motor 5 and energize the control circuit through contacts KA-1 and KA-2 in timed sequence. Upon energization of the control circuit, and with the arm of switch 29 in its upper position, contactor M will be moved immediately to its upper position connecting condensers C-1, C-2 and C-3 across the bus B-1, B-2 and B-3. The energizing of LW is also accomplished simultaneously and will tend to open contacts LC. However, the separation of contacts LC is delayed by the action of time delay mechanism LT. After a predetermined time (depending on the adjustment of LT) the contacts LC will open to deenergize MW thus allowing the bars MB to open the connection between B-1, B-2 and B-3 and C-1, C-2 and C-3. At the same time, resistors R-1, R-2 and R-3 are connected across C-1, C-2 and C-3 to discharge them. By adjusting KT and LT to correspond to the characteristics of motor 5, in effect of the large lagging currents drawn by motor 5 during initial energization will be compensated until motor 5 approaches running speed, at which time C-1, C-2 and C-3 are disconnected. These line voltage correcting condensers are of a size that will compensate for the starting effect of motor 5, but cannot be left in the circuit during running because of the resulting detrimental over-compensation. During running, any conventional regulator apparatus would operate to compensate for the load variations of motor 5.

The operation without the novel voltage regulator of the present invention can be compared with the above operation by considering that bars KB close contacts KC without closing auxiliary contacts KA-1 and KA-2. This action in itself would apply the load to the line which would require initially large lagging currents. Thus, until the motor comes up to speed, the power factor of this motor will be quite low and depress the line voltage. If the line voltage is unregulated this will cause a sharp drop in potential. If regulated, the regulator will tend to correct this drop, but will not be able to prevent a sudden drop of some extent which is necessary to initiate the regulator operation. Quite probably the regulator would tend to overcompensate because of the effect of power factor change as the motor comes up to speed. In any event, applying such a load would disturb the line voltage.

The auxiliary contacts KA-1 and KA-2, the associated control circuit and power factor correcting unit C (which affects the voltage regulation of the alternator of Fig. 1), however, act to anticipate the line variation and compensate for the large lagging currents during initial energization of motor 5. After the motor has come up to speed, and the power factor is that of the motor under normal running conditions, the unit C is removed from bus bars B-1, B-2 and B-3.

A second load, such as motor 20, can be connected to the bus B-1, B-2 and B-3 by closing switch 22. For this operation switch 29 will be positioned so that its switch arm is in the lower position. Switch 29 is, in effect, an interlock switch being actuated directly by, or remotely in conjunction with, contacts KA and NA; the switch arm of switch 29 being positioned so that the circuit between MW and contacts LC is closed when contacts KA-1 and KA-2 are closed, and being positioned so that the circuit between contacts OC and MW is closed when contacts NA-1 and NA-2 are closed.

The operation is the same as described above for motor 5 except for the correlation of the adjustments of NT and OT with the characteristics of motor 20. Thus, it will be seen that a plurality of motors of the same or differing characteristics can be regulated in accordance with the present invention with only one power factor correcting unit, if desired.

Referring now to Fig. 2, there is illustrated a second embodiment of the invention wherein a synchronous condenser SC is employed rather than the static condenser arrangement C shown in Fig. 1. A synchronous condenser is actually a synchronous motor which when overexcited acts like a capacitor to take leading volt-amperes and thus operate to control and improve the power factor and thus the voltage regulation of the alternator of Fig. 2. When underexcited it acts as an inductance to take lagging volt-amperes. Even though it be operating as a motor, its back E. M. F. may be made to exceed its terminal voltage in magnitude when the field is overexcited. Preferably such a motor is operated under no load or a light load. The operation of a synchronous motor as a synchronous condenser is best explained by the so-called and well-known "V-curves" which result from the graphing of field current versus armature current which demonstrate that leading or lagging currents can be supplied by the motor to compensate for the power factors of line loads.

A D. C. field CF of synchronous condenser SC is series-connected to a source of D. C. power through a rheostat R-4 and a pair of rheostats R-5 and R-6. Wires 35 and 37 connect one end and the arm of rheostat R-5 to contacts PC of a contactor P, respectively. The action of contacts PC is controlled by winding PW which is connected in the control circuit responsive to the action of contacts KA-1 and KA-2.

Similarly, the arm and one end of rheostat R-6 are connected through wires 41 and 39, respectively, to contacts QC of a contactor Q, which has a coil QW in the control circuit responsive to the action of auxiliary contacts NA-1 and NA-2.

Operation is the same as described above in regard to

Fig. 1 except that by employing separate contactors P and Q, switch 29 can be eliminated. Upon the initial energization of motor 5 by closing switch 9, contacts PC will be closed in timed sequence with contacts KC, and act to shunt a portion of the resistance of rheostat R–5. This will increase the field current and thus the excitation of synchronous condenser SC to compensate for the demagnetizing effect on the alternator by the large lagging starting currents required by motor 5. Contacts LC will be reopened at a predetermined time subsequent to their closing by the time delay action of LT.

Similarly, the decreased line voltage which would otherwise result from the actuation of motor 20 will be avoided by simultaneously and automatically increasing the energization of field CF during the starting period by the lowering of resistance of rheostat R–6. This is accomplished by the energization of the control circuit, including winding QW, to close the contacts QC, and the reopening of contacts QC after the delay resulting from timing mechanism OT. Additional flexibility (over that afforded by the adjustments of KT, LT, NT and OT) is provided in this embodiment by employing separately adjustable rheostats R–5 and R–6. Each, of course, may be adjusted to suit the characteristics of its associated motor.

Referring now to Fig. 3, alternator 1 is shown including a D. C. alternator field SF and D. C. auxiliary field AF and a D. C. exciter EX. An exciter series field SE and an exciter shunt field SH are associated components of exciter EX. The connections of motor 5, contactor K, relay L and their associated component units are the same as in Figs. 1 and 2, described above except that the control circuit is connected to wires 43 and 45, rather than to a contactor M or P.

Wires 43 and 45 may be connected alternatively to any one of a plurality of contactors R, S, T and U by closing any one of a plurality of associated switches S–1, S–2, S–3 or S–4, respectively. Contactor R, including a control winding RW, has a set of contacts RC connected in series with a D. C. power source, a field rheostat R–7 and auxiliary field AF. Contactor S controls, by means of its winding SW and contacts SC, the resistance of a field rheostat R–8 which is in series within a circuit including manually adjustable alternator field rheostat R–9, alternator field SF and the exciter EX. A rheostat R–10 is connected in a series circuit including the exciter series field SE and normally closed contacts TC of contactor T. The exciter shunt field is interconnected by rheostats R–11 and R–12 with series field SE. A portion of the resistance of the exciter shunt field rheostat R–11 is shunted by contacts UC of a contactor U.

Operation of the voltage regulator of this embodiment is the same as that described above with regard to the components of Figs. 1 and 2 up to and including the energization of wires 43 and 45 upon the closing of contacts KA–1 and KA–2. If S–1 is closed then winding RW will actuate contacts to a closed position and cause current flow through field AF to increase the effective excitation of alternator 1. R–7 is adjustable to match the characteristics of the motor actuated. The opening of contacts LC in response to time delay unit LT will deenergize field AF.

If S–2 is closed instead of S–1 then contacts SC will close (upon the closure of contacts KA–1 and KA–2) and shunt out a part of the resistance of rheostat R–8, thus increasing the excitation of alternator field SF until contacts LC open.

The closing of switch S–3, rather than either of switches S–1 or S–2, will also cause increased alternator excitation. This follows from the opening of contacts TC (upon energization of relay winding TW) which removes the diverting series field rheostat R–10 from across field SE to increase the voltage output of exciter EX.

By closing switch S–4, rather than S–1, S–2 or S–3, the winding UW of relay U causes contacts UC to shunt part of the resistance of the exciter shunt field rheostat R–11 and increase current flow through field SH, again causing a corresponding increase in the excitation of alternator 1.

Thus, the energization of any one of the contactors R, S, T or U results in an increase in excitation of the alternator 1 to compensate automatically and simultaneously (and during substantially only the starting period of motor 5) for the decrease in alternator output voltage which would otherwise result.

It will be noted that instead of regulating a single motor 5 by the circuit of the Fig. 3 embodiment, a plurality of separate motors each connected through a separate control circuit to coils UW, TW, SW and RW, respectively, could be simultaneously regulated. This is because the action of any one or more of the four different circuits to increase alternator excitation can take place at one time, the effects being cumulative. Moreover, as each rheostat R–7, R–8, R–10 and R–11 is variable, each may be conveniently adjusted to match the starting characteristics of separate and different motors. It will be further noted that the omission of either or any one of the contactors R, S, T, U will not prevent the effective action of any or all of the remaining ones. For example, if alternator 1 has no auxiliary field such as AF, contactor R would not be present but each of the other contactors S, T, U would be effective.

It is to be understood that the present invention is also applicable to single and multiphase A. C. systems and Y as well as delta connected three phase circuits. Also, the regulators of the present invention are useful for energizing A. C. loads other than motors and includes any type of A. C. load which when initially energized requires large currents. The regulation of any number of motors can be accomplished and, if desired, synchronous and static condensers as well as any or all of the excitation increasing arrangements of Fig. 3 may be used in a single A. C. distribution system or for a single alternator.

Further, it is to be understood that means for timing the sequence of contact closing (e. g. electronic, "RC", or clock-type delay or advance mechanisms) other than that shown in Fig. 4 may be used in lieu thereof.

The invention has been described in connection with cases in which the line voltage deviation is caused by current lagging the voltage. It is evident that it is applicable also to those remote cases in which the deviation is caused by current leading the voltage. For example, under the latter circumstances a suitable inductance would be substituted for the capacitance C in Fig. 1, or the excitation of the Figs. 2 and 3 synchronous condenser and alternator would be reduced instead of increased upon the initial application of the load. Also, where the deviation is caused by a substantially pure resistive load, the apparatus of the present invention will be operative.

It will be understood in connection with the above description that the contacts L–C, O–C, R–C, S–C, T–C and U–C of the respective timing relays L, O, R, S, T and U are all of the type in which the contact pairs are spring-mounted, so that upon actuation they remain closed for a suitable interval as they progress toward open positions.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A voltage regulator for an A. C. power source supplying energy to an electrical load which when initially energized normally would cause a variation in the voltage of said source, comprising a first contactor adapted when closed to interconnect said power source with said load and to energize a control circuit, a second contactor adapted to interconnect means for compensating for said voltage variation with said A. C. power source in response to energization of said control circuit, and time delay means adapted to deenergize said control circuit a predetermined time after the closing of said first contactor whereby said variation in the voltage of said source is substantially compensated for only during initial energization of said load.

2. A voltage regulator for an A. C. power source supplying energy to an inductive load which when initially energized normally would cause a variation in the voltage of said source, comprising a first electromagnetic contactor adapted when closed to interconnect said A. C. power source to said load, an auxiliary set of contacts associated with said contactor adapted to interconnect a source of power to a control circuit, means for closing said auxiliary contacts in timed sequence with said first contactor, a second contactor adapted to interconnect means for compensating for said voltage variation with said A. C. power source in response to energization of said control circuit, and a timing relay connected in said control circuit and adapted to deenergize said control circuit a predetermined time after the closing of said first contactor whereby said voltage variation in said A. C. source is substantially compensated for only during initial energization of said load.

3. A voltage regulator for an A. C. power source supplying energy to a plurality of A. C. motors which when initially energized normally would cause a variation in the voltage of said source, comprising a first contactor for each of said motors, a control circuit for each first contactor, each of said first contactors adapted when closed to interconnect a source of power to its respective control circuit and to a separate A. C. motor, a second contactor adapted to interconnect means for compensating for said voltage variation with said A. C. power source in response to energization of said any one of said control circuits, and time delay means in each of said control circuits adapted to deenergize its respective control circuit a predetermined time after the closing of the respective first contactor whereby said voltage variation in said A. C. source caused by each of said motors when initially energized is substantially compensated for only during initial energization thereof.

4. A voltage regulator as set forth in claim 3 wherein said A. C. motors have different characteristics.

5. A voltage regulator for an A. C. power source supplying energy to an A. C. motor which when initially energized normally would cause a variation in the voltage of said source, comprising a set of contacts adapted when closed to interconnect said power source to said motor, an auxiliary set of contacts adapted to interconnect a source of power to a control circuit, an adjustable timer controlling the closing sequence of said sets of contacts, a second set of contacts adapted to interconnect means for compensating for said voltage variation with said A. C. power source in response to energization of said control circuit, and time delay means adapted to deenergize said control circuit a predetermined time after the closing of said auxiliary contacts whereby said voltage variation in said A. C. source is substantially compensated for only during initial energization of said load.

6. A voltage regulator for an A. C. power source supplying energy to an A. C. motor which when initially energized normally would cause a variation in the voltage of said source, comprising a set of contacts adapted when closed to interconnect said power source to said motor, an auxiliary set of contacts adapted to interconnect a source of power to a control circuit, an adjustable timer controlling the closing sequence of said sets of contacts, a contactor having an actuating coil and adapted to interconnect means for compensating for said voltage variation with said A. C. power source in response to energization of said control circuit, an adjustable timing relay having a coil and a set of contacts, said control circuit including said contactor coil series-connected with said auxiliary contacts and said relay contacts, said relay coil being shunt-connected across said relay contacts and said contactor coil whereby said contactor is energized in timed sequence with energization of said motor to compensate for said voltage variation, and whereby said contactor is deenergized upon the opening of said timing relay contacts after a predetermined period of time.

7. A voltage regulator for an A. C. power source supplying energy to an A. C. motor which when initially energized normally would cause a variation in the voltage of said source, comprising a first contactor adapted when closed to interconnect said power source to said load and to energize a control circuit, a second contactor adapted to interconnect a condenser to said A. C. power source in response to energization of said control circuit, and time delay means adapted to deenergize said control circuit a predetermined time after the closing of said first contactor whereby said voltage variation in said A. C. source is substantially compensated for only during initial energization of said motor.

8. A voltage regulator as set forth in claim 7 wherein said condenser is a synchronous condenser.

9. A voltage regulator as set forth in claim 7 wherein said condenser is a static condenser.

10. A voltage regulator as set forth in claim 7 wherein said condenser is a static condenser, and wherein said second contactor includes a set of contacts adapted to discharge said condenser after deenergization of said control circuit.

11. A voltage regulator for an A. C. power source supplying energy to an A. C. motor which when initially energized has a low power factor, comprising a first contactor adapted when closed to interconnect said power source to said load and to a control circuit, a synchronous condenser connected to said A. C. source and having a D. C. field and a field resistor, a second contactor adapted to alter the resistance of said resistor in response to energization of said control circuit, and time delay means adapted to deenergize said control circuit a predetermined time after the closing of said first contactor whereby the effect of said power factor is substantially compensated for only during initial energization of said motor.

12. A voltage regulator for an A. C. power source supplying energy to a plurality of A. C. motors which when initially energized have low power factors, comprising a first contactor for each of said motors, a control circuit for each first contactor, each of said first contactors adapted when closed to interconnect said power source to its respective control circuit and to a separate A. C. motor, a synchronous condenser connected to said A. C. source and having a D. C. field and a plurality of field resistors, a second contactor for each of said control circuits each of said contactors adapted to alter the resistance of one of said resistors in response to energization of its respective control circuit, and time delay means in each of said control circuits adapted to deenergize its control circuit a predetermined time after the closing of the respective first contactor whereby the effect of said power factor of each of said motors when initially energized is substantially compensated for only during initial energization thereof.

13. A voltage regulator as set forth in claim 12 wherein said A. C. motors have different characteristics.

14. In an A. C. distribution system including an alternator having a D. C. field and a field resistor, said alternator supplying energy to an electrical load which when initially energized requires large lagging curents; a voltage regulator comprising a first contactor adapted when closed to interconnect said alternator to said load and to energize a control circuit, a second contactor adapted to alter the resistance of said resistor in response to energization of said control circuit, and time delay means adapted to deenergize said control circuit a predetermined time after the closing of said first contactor whereby the voltage variation caused by said large lagging currents is substantially compensated for only during initial energization of said load.

15. In an A. C. distribution system including an alternator having an auxiliary D. C. field and supplying energy to an electrical load which when initially energized requires large lagging currents; a voltage regulator comprising a first contactor adapted when closed to interconnect said alternator to said load and to energize a control circuit, a second contactor adapted to energize said auxiliary field in response to energization of said control circuit, and time delay means adapted to deenergize said control circuit a predetermined time after the closing of said first contactor whereby the voltage variation caused by said large lagging currents is substantially compensated for only during initial energization of said load.

16. In an A. C. distribution system an alternator having D. C. field and a D. C. exciter therefor, said alternator supplying energy to an electrical load which when initially energized requires large lagging currents; a voltage regulator comprising a first contactor adapted when closed to interconnect said alternator to said load and to energize a control circuit, a second contactor adapted to increase the D. C. field excitation in response to energization of said control circuit, and time delay means adapted to deenergize said control circuit a predetermined time after the closing of said first contactor whereby the voltage variation caused by said large lagging currents is substantially compensated for only during initial energization of said load.

17. In an A. C. distribution system for an alternator having a D. C. alternator field, a D. C. exciter, a D. C. exciter shunt field and a field resistor for said shunt field, said alternator supplying energy to an electrical load which when initially energized requires large lagging currents; a voltage regulator comprising a first contactor adapted when closed to interconnect said alternator to said load and to energize a control circuit, a second contactor adapted to decrease the resistance of said resistor in response to energization of said control circuit, and time delay means adapted to deenergize said control circuit a predetermined time after the closing of said first contactor whereby the voltage variation caused by said large lagging currents is substantially compensated for only during initial energization of said load.

18. In an A. C. distribution system for an alternator having a D. C. alternator field, a D. C. exciter, a D. C. exciter series field, and a field resistor connected in shunt with said series field, said alternator supplying energy to an electrical load which when initially energized requires large lagging currents; a voltage regulator comprising a first contactor adapted when closed to interconnect said alternator to said load and to energize a control circuit, a second contactor adapted to disconnect said resistor in response to energization of said control circuit, and time delay means adapted to deenergize said control circuit a predetermined time after the closing of said first contactor whereby the voltage variation caused by said large lagging currents is substantially compensated for only during initial energization of said load.

19. In an A. C. system including a source of A. C. power and an inductive load which when initially energized requires large lagging currents, a voltage regulator comprising a first contactor adapted when closed to interconnect said load to said power source, a set of auxiliary contacts associated with said contactor and adapted when closed to energize a control circuit, a second contactor adapted to interconnect means for compensating for the effect of said lagging currents to said A. C. power source in response to energization of said control circuit, and time delay means adapted to deenergize said control circuit a predetermined time after the closing of said first contactor whereby the voltage variation caused by said large lagging currents are substantially compensated for only during the energization of said control circuit.

20. In an A. C. system including a source of A. C. power and an A. C. motor which when initially energized requires large lagging currents, a voltage regulator comprising a set of contacts adapted when closed to interconnect said motor to said power source, a set of auxiliary contacts adapted when closed to energize a control circuit, an adjustable timer controlling the closing sequence of said sets of contacts, a contactor adapted to interconnect means for compensating for the effect of said lagging currents to said A. C. power source in response to energization of said control circuit, and time delay means adapted to deenergize said control circuit a predetermined time after the closing of said auxiliary contacts whereby the voltage variation caused by said large lagging currents is substantially compensated for only during the energization of said control circuit.

21. A voltage regulator for an A. C. power source supplying energy to an electrical load which when initially energized temporarily has an excessive phase difference between voltage and current, comprising a control circuit, a first contactor adapted when closed to interconnect said power source to said load and to close said control circuit, means operative in connection with said power source for compensating for the effect of said excessive phase difference, a second contactor adapted in response to energization of said control circuit to make said compensating means operative in connection with the power source and adapted in response to deenergizing of the control circuit to make said compensating means inoperative in connection with the power source, and a time-delay contactor connected with said control circuit and response to closure thereof adapted with time delay to deenergize said control circuit.

References Cited in the file of this patent

UNITED STATES PATENTS

| | | |
|---|---|---|
| 1,940,295 | Chutter | Dec. 19, 1933 |
| 2,298,026 | Bany | Oct. 6, 1942 |

FOREIGN PATENTS

| | | |
|---|---|---|
| 605,937 | Great Britain | Aug. 4, 1948 |